US012691828B2

(12) United States Patent
Magni

(10) Patent No.: US 12,691,828 B2
(45) Date of Patent: Jul. 28, 2026

(54) ROTARY TELESCOPIC BOOM LIFT

(71) Applicant: MAGNI REAL ESTATE S.R.L.,
Castelfranco Emilia (IT)

(72) Inventor: Riccardo Magni, Modena (IT)

(73) Assignee: MAGNI REAL ESTATE S.R.L,
Castelfranco Emilia (IT)

( * ) Notice: Subject to any disclaimer, the term of this
patent is extended or adjusted under 35
U.S.C. 154(b) by 300 days.

(21) Appl. No.: 18/568,572

(22) PCT Filed: Jun. 10, 2022

(86) PCT No.: PCT/EP2022/065900
§ 371 (c)(1),
(2) Date: Dec. 8, 2023

(87) PCT Pub. No.: WO2022/263329
PCT Pub. Date: Dec. 22, 2022

(65) Prior Publication Data
US 2024/0270174 A1     Aug. 15, 2024

(30) Foreign Application Priority Data

Jun. 15, 2021     (IT) ........................ 102021000015530

(51) Int. Cl.
*B60R 3/02* (2006.01)
*B66F 9/065* (2006.01)
*B66F 9/075* (2006.01)

(52) U.S. Cl.
CPC .............. *B60R 3/02* (2013.01); *B66F 9/0655*
(2013.01); *B66F 9/07504* (2013.01)

(58) Field of Classification Search
CPC ......... B60R 3/02; B60R 3/007; B66F 9/0655;
B66F 9/07504
See application file for complete search history.

(56) References Cited

U.S. PATENT DOCUMENTS 3,656,578 A * 4/1972 Hemken ............... E02F 9/0833
182/20
4,825,975 A * 5/1989 Symes .................... B60R 11/00
182/159

(Continued)

FOREIGN PATENT DOCUMENTS

WO     WO-2008139665 A1 * 11/2008   ............... E06C 7/48

OTHER PUBLICATIONS

International Search Report dated Aug. 26, 2022 issued in PCT/
EP2022/065900.

(Continued)

*Primary Examiner* — James A Shriver, II
*Assistant Examiner* — Ian Bryce Shelton
(74) *Attorney, Agent, or Firm* — Scully, Scott, Murphy &
Presser, P.C.

(57)     ABSTRACT

A rotary telescopic boom lift, comprising at least one
vehicle, which supports a rotating assembly, which is pro-
vided at least with one telescopic boom, adapted to support
a work accessory, and with a cab. At least one ladder is
coupled to one wall of the vehicle in order to allow the
operator to climb into the cab or climb down to the ground.
The lift comprises at least one handle, configured to move
between a first configuration and a second configuration.

9 Claims, 6 Drawing Sheets

(56)                References Cited

U.S. PATENT DOCUMENTS

| | | | | |
|---|---|---|---|---|
| 5,033,582 A * | 7/1991 | Hoben | ..................... | B60R 3/02 |
| | | | | 182/127 |
| 5,687,813 A * | 11/1997 | Bensch | .................. | B60R 3/007 |
| | | | | 182/127 |
| 6,003,633 A * | 12/1999 | Rolson | ..................... | E06C 5/02 |
| | | | | 182/127 |
| 7,025,174 B1 * | 4/2006 | Hawley | ..................... | B60R 3/02 |
| | | | | 182/127 |
| 10,035,462 B2 * | 7/2018 | Iotti | ..................... | B66F 9/0655 |
| 11,053,736 B1 * | 7/2021 | Becker | ..................... | E06C 5/40 |
| 11,732,530 B2 * | 8/2023 | Moss | ........................ | E06C 1/08 |
| | | | | 182/106 |
| 11,987,953 B2 * | 5/2024 | Iotti | ........................ | B60R 3/02 |
| 12,091,302 B2 * | 9/2024 | Iotti | ..................... | B66F 17/003 |
| 12,286,331 B2 * | 4/2025 | Tanimoto | ................ | B60R 3/005 |
| 2008/0202850 A1 * | 8/2008 | Anderson | ................ | E06C 7/48 |
| | | | | 182/106 |
| 2019/0085635 A1 * | 3/2019 | Simula | ..................... | E06C 5/04 |
| 2021/0107360 A1 * | 4/2021 | Iotti | ..................... | B60K 35/28 |
| 2021/0156113 A1 * | 5/2021 | Iotti | ........................ | B60R 3/005 |
| 2022/0204328 A1 * | 6/2022 | Iotti | ..................... | B66F 17/003 |

OTHER PUBLICATIONS

Written Opinion dated Aug. 26, 2022 issued in PCT/EP2022/065900.

Italian Search Report dated Jan. 10, 2022 issued in IT 202100015530, with partial translation.

* cited by examiner

ROTARY TELESCOPIC BOOM LIFT

The present invention relates to a rotary telescopic boom lift.

As is known, the vast category of self-propelled works vehicles comprises telescopic boom lifts, i.e., vehicles typically used to move goods and bulky equipment and/or to perform interventions of various kinds at considerable heights.

In the general configuration, which is by now well-established, known lifts comprise a vehicle or truck mounted on wheels or tracks which can move on the ground and supports directly or indirectly (the first end of) a telescopic boom, with which accessories of various kinds can be associated as a function of the intervention that the lift is called to perform.

In this context, rotary telescopic boom lifts are also known in which the vehicle supports rotatably an assembly which rotates about a vertical axis: the assembly comprises the telescopic boom and usually a cab designed to accommodate an operator.

The possibility to rotate the cab and the boom in particular increases considerably the versatility of the lift, since for an equal position assumed by the vehicle (often imposed or conditioned by the shape of the terrain and by the surrounding infrastructures) it extends the area of intervention of the boom, multiplying the positions that can be reached by the accessory supported by said boom.

In any condition of use, the cab is thus always raised with respect to the ground (at a distance which obviously depends on the height of the underlying vehicle).

Furthermore, during use of the boom, the cab is moved further upward by the stabilizing arms with which machines of this type are equipped and which, as is known, indeed have the task of stabilizing the machine, lifting it and extending its resting base.

Therefore, in order to be able to ensure access to the cab, ladders are normally provided along the four walls of the underlying vehicle and allow the operator to climb into the cab or down from it in a practical manner in any orientation assumed by the cab following the rotation of the assembly.

However, this constructive solution is not free from drawbacks.

When the cab is rotated with respect to the driving position, the operator who wishes to climb down from the cab looks out of the door and finds below him a portion of the vehicle: he can therefore climb down by reaching the first rung of the ladder that is closest to him.

In doing so, however, it would be preferable to be able to rely on a grip point to be gripped with his hands, but such grip point, in order to be conveniently and safely reachable, would be in such a position as to interfere with the rotation of the cab when the assembly is moved in normal use. Therefore, the operator cannot make use of any grip point and descent must occur in poor safety conditions.

The aim of the present invention is to solve the problems described above, providing a rotary telescopic boom lift that allows the operator to climb into the cab or down from it in a practical and safe manner in any operating position of the cab.

Within this aim, an object of the invention is to provide a rotary telescopic boom lift that adopts suitable refinements in order to allow the operator to climb into the cab or down from it safely, without interfering with the movements of the telescopic boom, of the cab itself and of the rotary assembly in general.

Another object of the invention is to provide a rotary telescopic boom lift that ensures high reliability in operation.

Another object of the invention is to propose a rotary telescopic boom lift that adopts a technical and structural architecture that is alternative to those of lifts of the known type.

Not the least object of the invention is to provide a rotary telescopic boom lift that can be obtained easily starting from commonly commercially available elements and materials.

Another object of the invention is to provide a rotary telescopic boom lift that has low costs and is safe in application.

This aim and these and other objects which will become more apparent hereinafter are achieved by a rotary telescopic boom lift, comprising at least one vehicle, which can move on the ground and supports rotatably a rotating assembly provided at least with one telescopic boom adapted to support a work accessory, and with a cab configured to accommodate an operator, at least one ladder being coupled externally to at least one wall of said vehicle in order to allow the operator to climb into said cab or climb down to the ground, characterized in that it comprises at least one handle, which can move between a first configuration for minimum space occupation and a second active configuration, in said first configuration said handle being entirely arranged below the rotation area of said assembly, in said second configuration at least one portion of said at least one handle protruding upward beyond the upper profile of said vehicle, being arranged in the rotation area of said assembly at least proximate to said ladder.

Further characteristics and advantages of the invention will become more apparent from the description of two preferred but not exclusive embodiments of the rotary telescopic boom lift according to the invention, illustrated by way of non-limiting example in the accompanying drawings, wherein:

FIG. 1 is a lateral elevation view of the rotary telescopic boom lift according to the invention;

FIG. 2 is a front elevation view of the lift of FIG. 1;

FIGS. 3 and 4 are lateral elevation views of a ladder and two associated handles of the lift of FIG. 1, in the first and second configurations respectively;

FIG. 5 is a lateral elevation view of the rotary telescopic boom lift according to the invention;

FIG. 6 is a front elevation view of the lift of FIG. 5;

FIG. 7 is a lateral elevation view of a ladder and two associated handles of the lift of FIG. 5, in the first configuration, furthermore showing the movement of the handles for transition to the second configuration.

Figure 1:
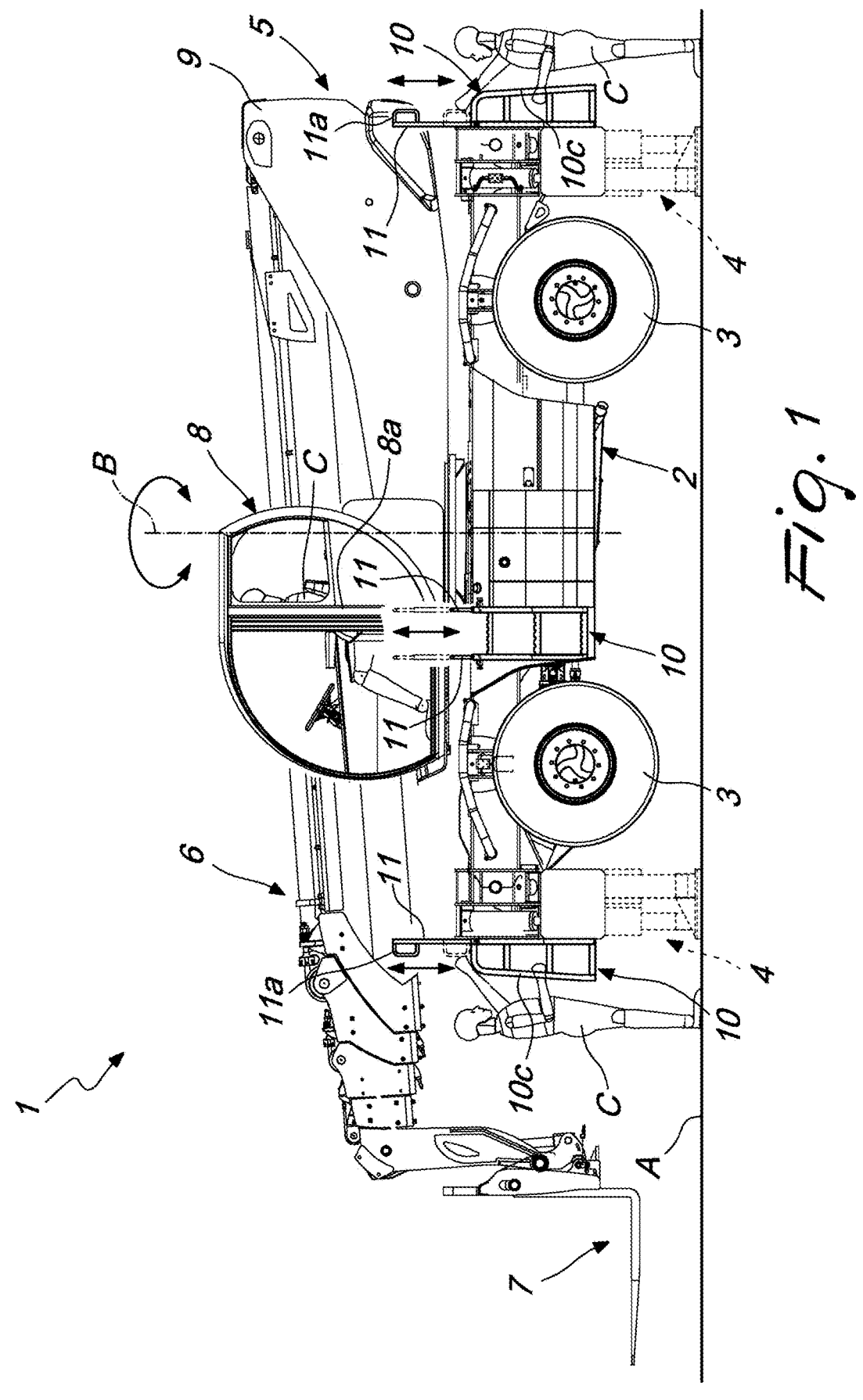
FIGS. 1 to 4 are views of the lift according to the invention in the first embodiment, more particularly.
Figure 2:
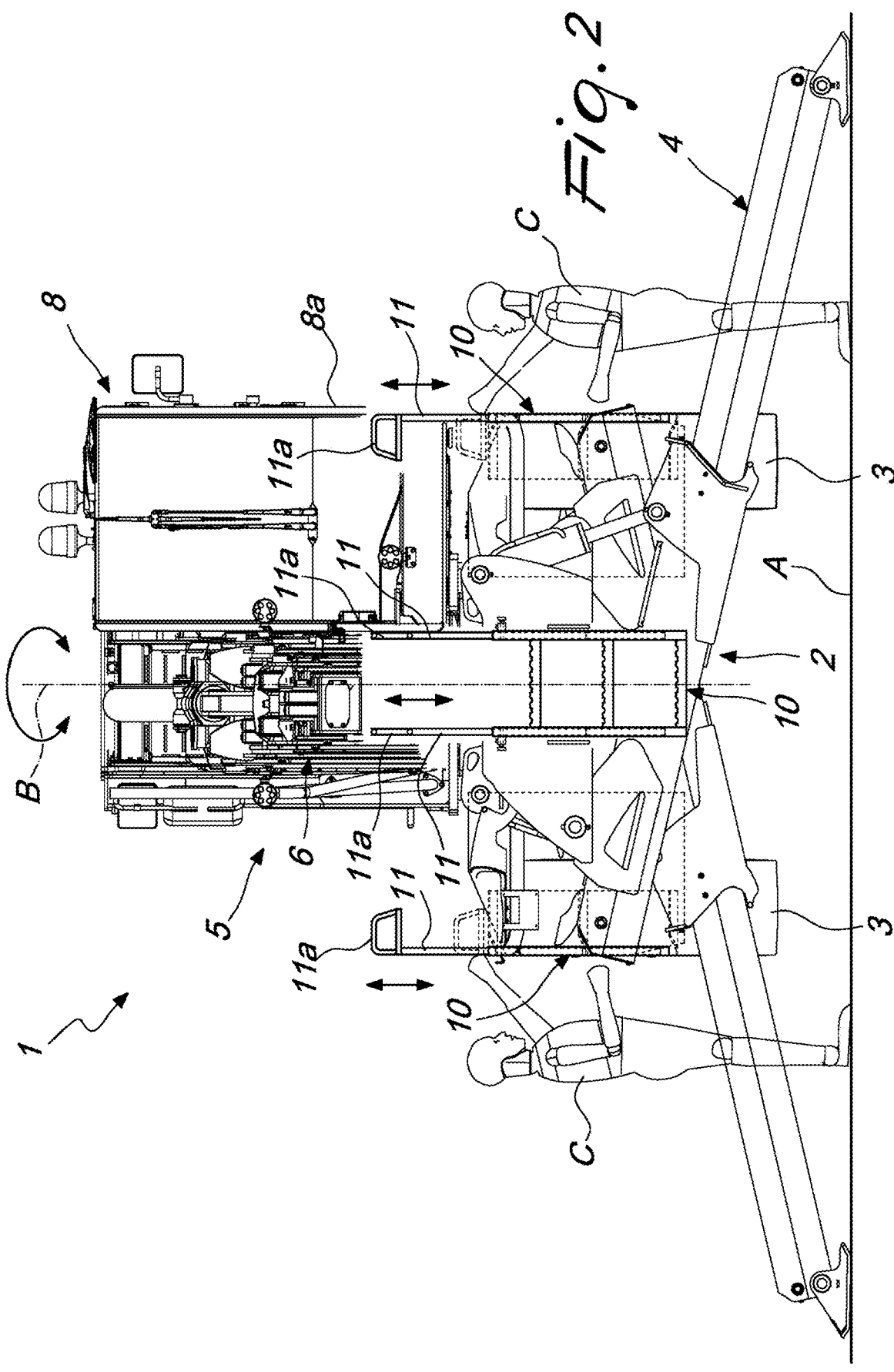

With particular reference to the figures, the reference numeral 1 generally designates a rotary telescopic boom lift which comprises at least one vehicle 2 (or truck) which can move on the ground A.

It should be noted that in this discussion the term "boom lift" also comprises all self-propelled work machines that are also known in the sector under the name "telescopic handler" or "telehandler".

Indeed to be able to move freely on the ground A (be it the road surface, farmland, the area of a building yard or any other supporting surface), the vehicle 2 is typically provided with wheels 3 or tracks, associated with an adequate traction system (which is chosen in any case of a type known per se).

More generally, the entire vehicle 2 can be of the traditional type and chosen so as to correspond to the constructive solution (among the many solutions widespread in the field) that the person skilled in the art would deem in each instance most suited for the purpose.

Furthermore, in order to be able to bear heavy loads and ensure adequate support even during interventions at high elevations, the vehicle 2 is preferably provided with stabilizing means 4, which also can be chosen of a known type (and for example of the scissor-like type, as in the accompanying figures).

In any case, the vehicle 2 uniquely identifies an ideal resting surface (the ground A): hereinafter, where reference is made to "upper" or "lower" arrangements, or to "high" or "low" or similar expressions, these terms must be considered to refer to said ideal resting surface.

The vehicle 2 rotatably supports a rotating assembly 5 (which rotates about a rotation axis B): in greater detail, the rotation axis B about which the assembly 5 can rotate is perpendicular to the ideal resting surface just mentioned and therefore, in an equivalent manner, it is possible to state that the assembly 5 can rotate (with respect to the vehicle 2) about a vertical axis B.

In the configuration adopted during road travel, the lift 1 has the minimum transverse space occupation and therefore preferably the assembly 5 is arranged so as to be longitudinally aligned with the vehicle 2 (along the advancement direction), so as to keep its own plan shape substantially within the plan shape of the underlying vehicle 2 (as in the accompanying figures), so as to not increase significantly the transverse space occupation of the lift 1, with respect to what has already been defined by the vehicle 2 itself.

The assembly 5 is provided at least with one telescopic boom 6 that is adapted to support a work accessory 7 and with a cab 8 a that is configured to accommodate an operator C.

When the assembly 5 rotates about the rotation axis B, one or both of the lateral doors 8a of the cab 8 can face the front portion or the rear portion of the vehicle 2, especially when (as in the accompanying figures) the cab 8 is arranged at or proximately to the rotation axis B of the assembly 5.

In greater detail, in the preferred solution (which in any case does not limit the application of the invention) the assembly 5 comprises a base structure 9 which is supported rotatably by the vehicle 2: a first end of the telescopic boom 6 is articulated (about an axis which is horizontal or parallel to the ground A) to the structure 9, which rigidly supports the cab 8. In a well-known manner, the telescopic boom 6 is composed of a plurality of segments or telescopic elements which are arranged in series and can be mutually extracted and, on the opposite side with respect to the structure 9, is provided with a free end which can be coupled to the accessory 7 of interest.

The accessory 7 can be of any type: in the accompanying figures, by way of example, it has been chosen to show an accessory 7 constituted by a fork, but it might be any other object or tool suitable for the purpose for which one intends to use the lift 1 (and it might also be a platform designed to accommodate a person).

The accessory 7 can also be interchangeable, so that it can be replaced at each intervention, as a function of the specific requirements. The accessory 7 or a set of accessories 7 can therefore be comprised within the lift 1, but the protective scope claimed herein also comprises lifts 1 that do not have accessories 7, which can thus be obtained separately.

Besides, the possibility is not excluded that the lift 1 might be provided with two or more booms 6 which are for example mutually articulated.

It is stressed in any case that for all the aspects that are not discussed in detail in the present description, any constructive detail related to the vehicle 2, the stabilizing means 4, the assembly 5, the traction elements (of the vehicle 2) and the movement elements (of the assembly 5 and of the boom 6), the cab 8, the boom 6, the electronic equipment and anything else can be of a known type.

In particular, therefore, the person skilled in the art can choose in each instance the equipment and embodiment deemed most appropriate, based on common skills of the field and as a function of the specific requirements, without in any case abandoning the protective scope claimed herein.

Furthermore, at least one ladder 10 is coupled externally to at least one wall of the vehicle 2 in order to allow the operator C to climb into the cab 8 or climb down to the ground A.

In this regard, the possibility is provided that the lift 1 has a single ladder 10, associated with selectively one of the four walls of the vehicle 2 (the two side walls, the front wall and the rear wall). Preferably, however, more than one wall of the vehicle 2 is provided with ladders 10 or, better still, each wall rigidly supports (at least) one respective ladder 10 (as in the accompanying figures), so as to offer the operator C different options, including choosing the most practical one for climbing into the cab 8 or climbing down from it, in any position assumed by said cab as a consequence of the rotation of the assembly 5 with respect to the vehicle 2.

According to the invention, the lift 1 comprises at least one handle 11, which can move between a first configuration of minimum space occupation and a second active configuration (transition from the first configuration to the second one can be performed manually or by resorting to an actuator or other automatic systems).

The handle 11 can be coupled in various ways to the ladder 10 (two examples will be described in this regard on the pages that follow) or can be simply coupled to the vehicle 2 or to another element of the lift 1.

In the first configuration, the handle 11 is entirely arranged below the rotation area of the assembly 5 (the ladder 10 is rigidly anchored to the vehicle and therefore it is arranged below the rotation area in every operating condition).

The term "rotation area" is understood to reference the region of space that the assembly 5 can occupy progressively when it rotates about the rotation axis B.

Figures 3, 4:
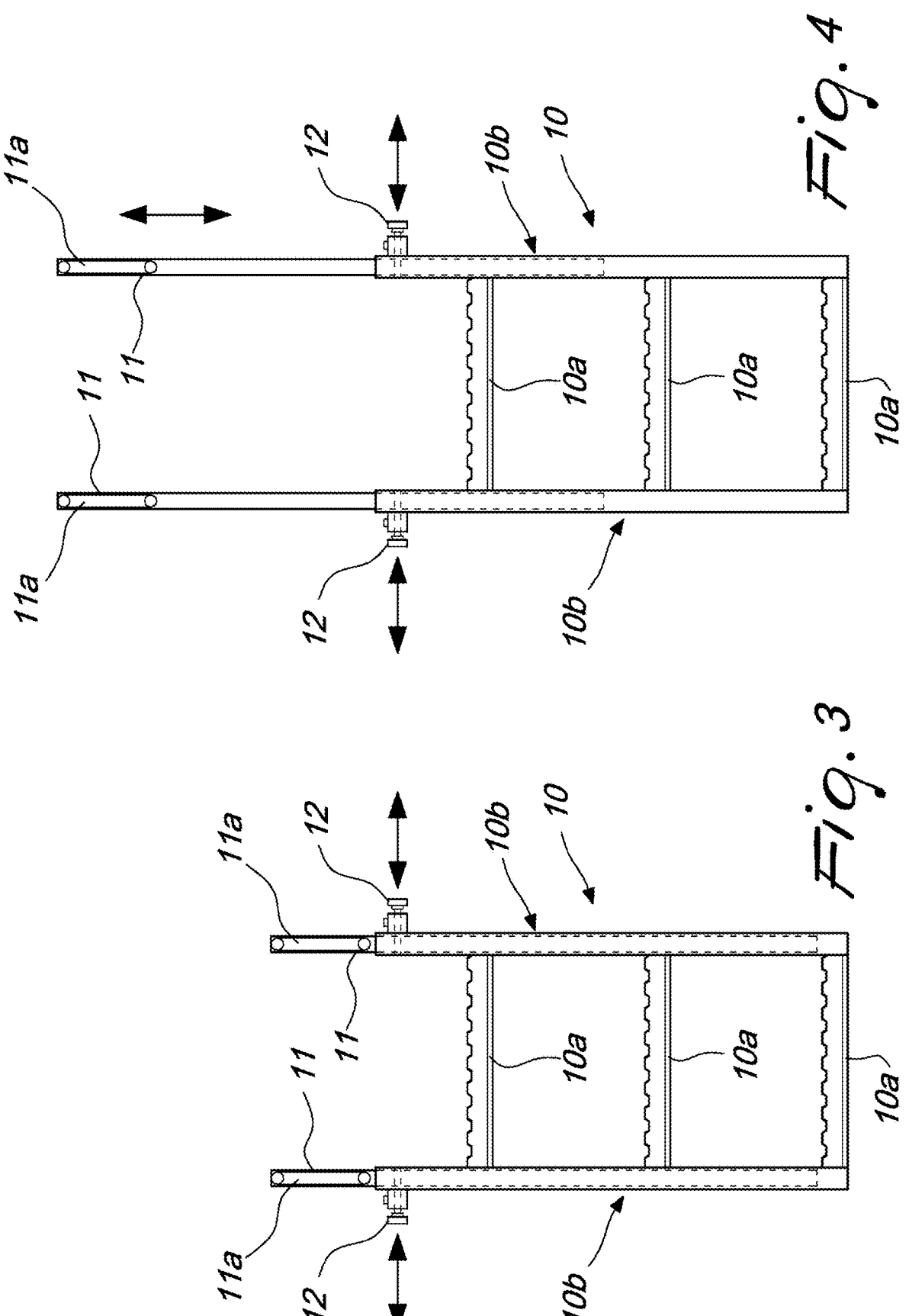

As long as the handle 11 is arranged in the first configuration (FIG. 3 or 7, for example), it does not interfere with the free rotation of the assembly 5.

In the second configuration, instead, at least one portion of the handle 11 protrudes in an upper region (upward) beyond the upper profile (the top) of the vehicle 2, being thus arranged in the rotation area of the assembly 5 at least proximate to the ladder 10. The handle 11 can thus be moved to the second configuration (manually or in an at least partially automatic manner) only when, with the rotation of the assembly 5 stopped, the operator C wishes to climb into the cab 8 or climb down from it, so as to offer him a valid and practical support, in order to allow him to move more safely and avoiding the danger of accidental falls.

In this context, therefore, the expression "in the vicinity" of the ladder is to be understood as any position that makes it possible to offer a grip to the operator C while he prepares to climb down the ladder 10 (so as to rest his foot on the highest rung). For example, in the second configuration the handle 11 can be aligned with, and contiguous to, one side of the ladder 10.

The adoption of at least one handle 11 that can move as indicated above thus makes it possible to achieve the intended aim and objects.

In particular, to offer an even more stable and safe grip to the operator C, the lift 1 comprises two handles 11 (but they might be more), aligned with opposite sides of the (same) ladder 10 in the second configuration. In any case, different arrangements of the two handles 11 with respect to the ladder 10 in the second configuration (albeit in the vicinity thereof) are not excluded.

Obviously, in the (preferred) case in which the lift 1 is provided with two or more ladders 10, each one of them can be associated with a number at will of handles 11 (preferably two, as in the accompanying figures).

More generally, what is discussed hereinafter regarding one or two handles 11 and the associated ladder 10 may be understood to be valid for any number of ladders 10 at will (if the number is larger than one) and preferably for all.

In the preferred but not exclusive embodiment of the accompanying figures, each ladder 10 comprises a plurality of rungs 10a which are interposed between two stringers 10b (which constitute therefore the sides of the ladder 10); furthermore, in order to ensure easier and safer use, respective lateral shoulders 10c can protrude (at right angles to the rungs 10a) from the stringers 10b. The reference numerals 10a and 10b are shown exclusively in FIGS. 3, 4 and 7 in order to avoid encumbering the remaining figures excessively.

Figure 5:
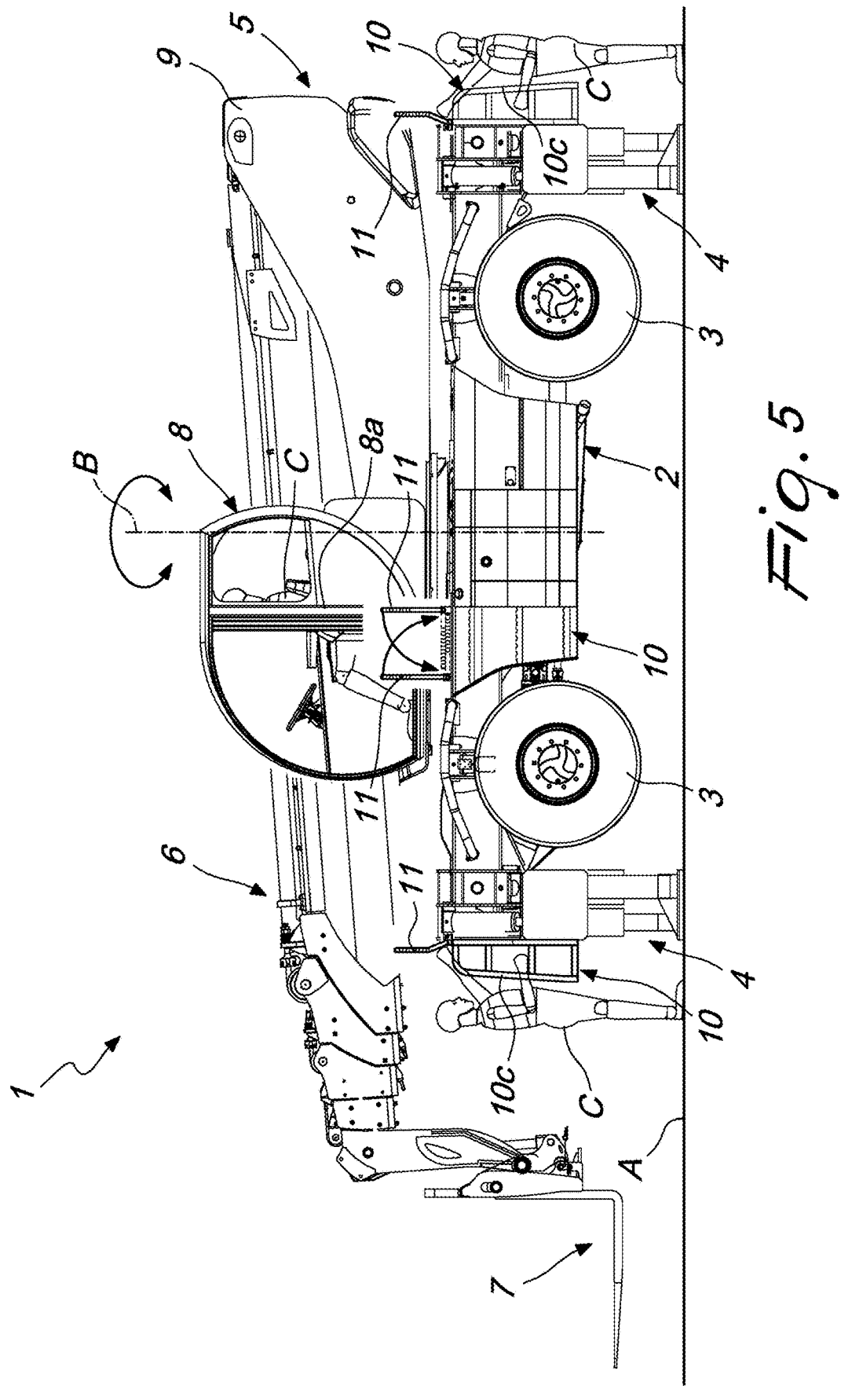
FIGS. 5 to 7 are views of the lift according to the invention in the second embodiment, more particularly.
Figure 6:
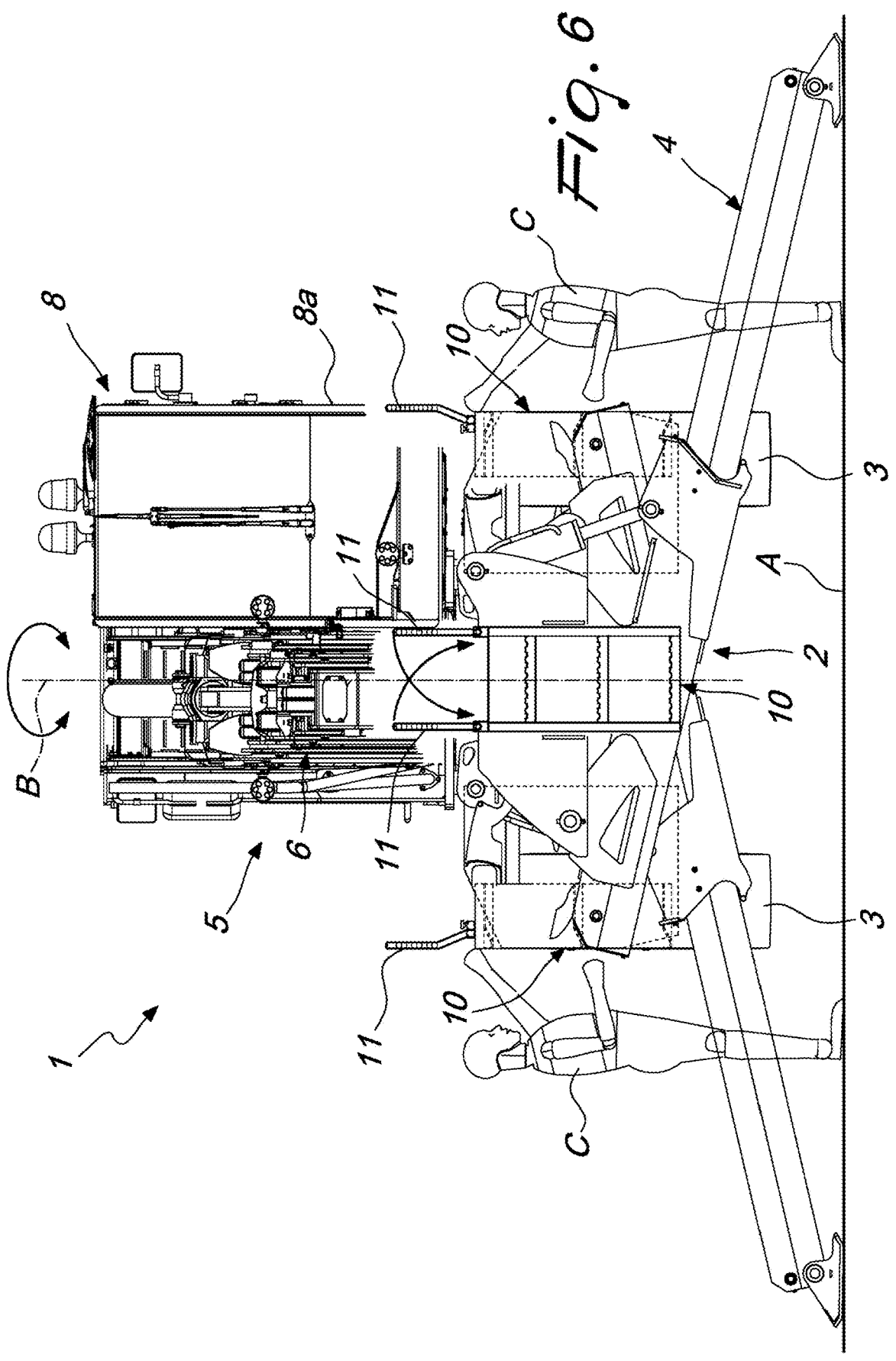
Figure 7:
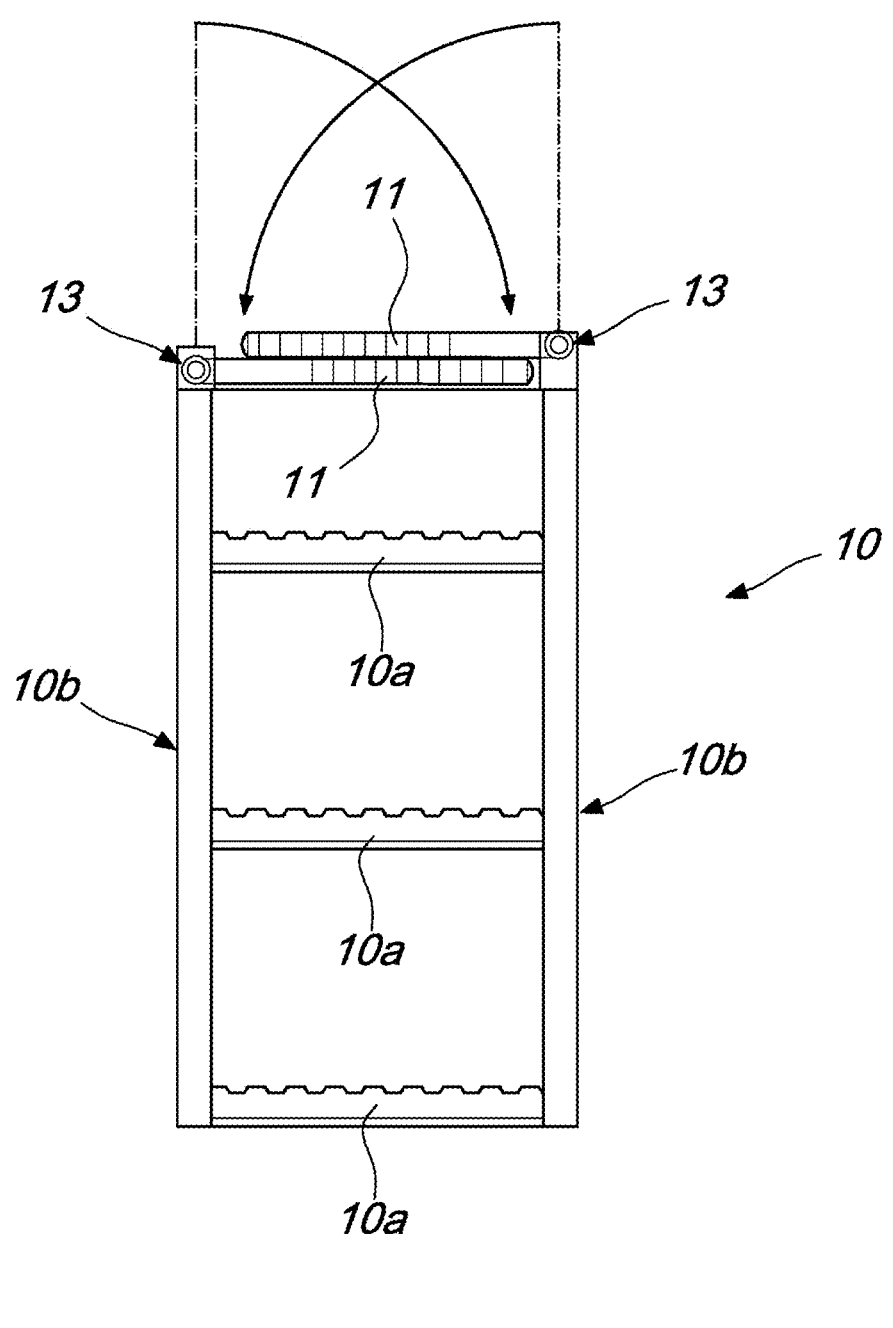

With further reference to the solution of the accompanying figures (which is preferred but not exclusive), the handle 11 is constituted by a profiled element of appropriate shape and dimensions, which can be rectilinear (as in the embodiment of FIGS. 1-4) or inclined or curvilinear (FIGS. 5-7). Furthermore, each handle 11 can be provided with a wing 11a (FIGS. 1-4) which allows easier grip by the user.

Usefully, the lift 1 comprises at least one locking element, which is normally arranged so as to interfere with the free movement of a respective handle 11 and can be deactivated, at least temporarily, for clearance to transition between said configurations. The locking element, which can be chosen of any type (some practical examples thereof will be provided on the pages that follow, merely by way of non-limiting example), can thus prevent the handle 11 from accidentally reaching the second configuration during the rotation of the assembly 5 (with consequent impacts or damage) or, vice versa, from returning to the first configuration when vice versa the operator C wishes to use it.

In any practical embodiment of the element (such as those that will be described hereinafter or others still), a spring or other elastic element may keep the element in interference with the rotation of the respective handle 11. Furthermore, the element can be moved manually or by means of an actuator or other automatic apparatuses.

In a first embodiment of the invention, illustrated by way of non-limiting example of the invention in FIGS. 1-4, the handle 11 is of the telescopic type and is coupled slidingly to the respective ladder 10.

In particular, and although different configurations and arrangements for the handle 11 with respect to the ladder 10 are not excluded, preferably the handle 11 is accommodated slidingly in a stringer 10b of the ladder 10. In this solution, shown in FIGS. 1-4, the handle 11 comprises or is constituted by a profiled element (having a square, rectangular, circular, polygonal, etc. cross-section) which can slide within a stringer 10b which in turn is constituted by a hollow profiled element that has a corresponding transverse cross-section.

More particularly, in this embodiment the locking element comprises a knob 12 which is arranged along one side of the ladder 10 and is normally arranged so as to interfere with the sliding of the handle 11. For example, along the side of the ladder 10 (the stringer 10b) there can be a hole and two other holes can be arranged along the handle 11, so that both in the first configuration and in the second configuration the hole of the ladder 10 is aligned with a respective hole of the handle 11: thus, in both configurations the knob 12 enters the aligned elements and prevents relative sliding. The movement of the handle 11 is allowed by extracting temporarily the knob 12 from the holes (the movement of the knob 12 is shown by arrows in FIGS. 3-4).

In a second embodiment of the invention, which is shown in FIGS. 5-7 and which in any case does not exhaust the possible ways of carrying out, which are in any case comprised within the protective scope claimed herein, the handle 11 is rotatably coupled to the respective ladder 10. Thus, in the second configuration the handle 11 is aligned with a first side (with a stringer 10b) of the ladder 10; in the first one it is instead rotated through 90 degrees (or even through another angle) about one end of the ladder 10 (of the stringer 10b), with respect to the second configuration, and is directed toward the second side of the ladder 10. In practice, as a consequence of the 90 degree rotation, in the first configuration the handles 11 are parallel to the rungs 10a and perpendicular to the stringers 10b.

FIG. 7 shows the positions assumed by two handles 11 in the first configuration (solid line) and in the second configuration (broken line); furthermore, two arrows show the rotation for transition from the second configuration to the first one.

In particular, in this embodiment the locking element comprises a stop member 13 which is arranged at the end of the ladder 10.

Advantageously, the lift 1 comprises at least one sensor adapted for the monitoring, instant by instant, of the configuration assumed by the handle 11. In this regard, the sensor can be a proximity sensor or of any other type and can be chosen so as to be assigned to measure the specific value deemed in each instance most appropriate for the purpose.

More particularly, the sensor is associated with a control and management unit, provided with instructions for the at least temporary inhibition of the rotation of the assembly 5 when the respective handle 11 is arranged in the second configuration (thus preventing a rotation of the assembly 5 with the handle 11 raised from causing the rotation or destruction of the latter or, worse still, damage of the assembly 5).

The control and management unit is typically (but not exclusively) a controller, a computer, another hardware item, which can be reprogrammed or not (for example with a microprocessor) and is usually the same one to which control of the entire lift 1 is assigned (and which will therefore have additional instructions for the task just described). In any case, it is not excluded to provide a dedicated electronic module, to be installed on the lift 1 and assigned uniquely to the acquisition of the data from the cited sensor and to the at least temporary inhibition of the rotation of the assembly 5.

The operation of the rotary telescopic boom lift according to the invention is evident from what has already been described, but a summary thereof is given hereinafter.

In per se traditional ways, the vehicle 2 can move on the ground A in order to place itself at the location and exact point where it is necessary to perform an intervention (usually at a given height from the ground A), so that indeed the use of the lift 1 (of the accessory 7 mounted on the boom 6) is required. In greater detail, after reaching the intervention point it is possible to activate the means 4 to obtain a more stable grip on the ground A, to then rotate the assembly 5 with the cab 8 and the boom 6, furthermore moving the latter (by rotating and making the telescopic elements slide mutually), until the accessory 7 is brought to the exact intervention point.

As shown, when the assembly 5 rotates, advantageously each handle 11 is kept in the first configuration, in which (like the ladder 10) it is entirely arranged below the rotation area of said assembly 5, without therefore interfering in any way.

Vice versa, when the assembly 5 is stationary, while the ladder 10 remains obviously in the same position the handle 11 can be moved into the second configuration, in which at least one portion thereof protrudes above (upward) beyond the upper profile of the vehicle 2, arranged in the rotation area of the assembly 5 in any case proximately to the ladder 10. It is thus located in a region in which it can constitute a valid support for the operator C who wishes to climb down from the cab 8 (or also for anyone who wishes to climb into it).

It should be noted that as long as the assembly 5 is aligned with the underlying vehicle 2 (in the configuration of minimum transverse space occupation), the door 8a of the cab 8 is located exactly above the ladder 10 mounted on the side wall of the vehicle 2: in this context, although it is possible in any case to resort to the handle 11, the operator C who wishes to climb down from the cab 8 finds right below him the first rung 10a of the ladder 10 and can reach it by gripping an optional grip element mounted on the cab 8.

The invention is therefore particularly useful when the cab 8 (especially if mounted proximate to the rotation axis B of the assembly 5) is stopped in a position that is different with respect to the configuration described earlier (the cab 8 is rotated with respect to the configuration of minimum space occupation): in this case, the operator C who wishes to climb down from the cab 8 finds below him a portion of the vehicle 2 and the doors 8a are spaced also from the nearest ladder 10, thus rendering insufficient the aid provided by any grip element mounted on the cab 8. In this case, the operator C can validly rely on the handles 11 to climb down safely.

By virtue of the handle 11 which can move between two configurations, therefore, the lift 1 allows the operator C to climb into or down from the cab 8 in a practical and most of all safe manner in any operating position of the latter.

The movement of each handle 11 can be of the telescopic (or in any case translational), rotary or other type, without in any case abandoning the protective scope claimed herein and in any case obviously ensuring the benefits described above.

In particular, the handle 11 offers a valid grip to the operator C only when it is conveniently arranged in the second configuration, whereas in the first one it does not interfere in any way with the movements of the telescopic boom 6, of the cab 8 and of the rotating assembly 5 in general.

Furthermore, it has already been noted that the locking element and/or the sensor offer particularly safe operating modes, preventing unwanted accidental movements of the handle 11 and/or the rotation of the assembly 5 when the latter is in the second configuration.

The constructive simplicity that characterizes the handle 11 is furthermore an assurance of low cost and reliability also over time.

The invention thus conceived is susceptible of numerous modifications and variations, all of which are within the scope of the appended claims; all the details may furthermore be replaced with other technically equivalent elements.

In the exemplary embodiments shown, individual characteristics, given in relation to specific examples, may actually be interchanged with other characteristics that exist in other exemplary embodiments.

In practice, the materials used, as well as the dimensions, may be any according to the requirements and the state of the art.

The disclosures in Italian Patent Application No. 102021000015530 from which this application claims priority are incorporated herein by reference.

The invention claimed is:

1. A rotary telescopic boom lift, comprising at least one vehicle, which can move on the ground and a rotatable assembly comprising at least one telescopic boom adapted to support a work accessory and a cab configured to accommodate an operator;
   at least one ladder coupled externally to at least one wall of said vehicle;
   at least one handle configured to move between a first configuration for minimum space occupation and a second active configuration, in said first configuration said handle being entirely arranged below a rotation area of said assembly, in said second active configuration at least one portion of said at least one handle protruding upward beyond the upper profile of said vehicle, being arranged in the rotation area of said assembly at least proximate to said ladder;
   and at least one sensor adapted to monitor instant by instant the first configuration and second active configurations assumed by said at least one handle.

2. The rotary telescopic boom lift according to claim 1, further comprising two of said handles which are aligned with opposite sides of said ladder in said second configuration.

3. The rotary telescopic boom lift according to claim 1, further comprising at least one locking element, which is arranged to interfere with a free movement of a respective one of said handles and is configured to be deactivated, at least temporarily, for clearance to transition between said configurations.

4. The rotary telescopic boom lift according to claim 1, wherein at least one handle is of the telescopic type and is coupled slidingly to said ladder.

5. The rotary telescopic boom lift according to claim 4, wherein said handle is accommodated slidingly within a stringer of said ladder.

6. The rotary telescopic boom lift according to claim 3, wherein said at least one locking element comprises a knob which is arranged along one side of said ladder and is arranged to interfere with the sliding of said handle.

7. The rotary telescopic boom lift according to claim 3, wherein said at least one handle is coupled rotatably to said ladder, in said second configuration said handle being aligned with a first side of said ladder, in said first configuration said handle being rotated by 90 degrees about one end of said ladder, with respect to said second configuration, and being directed toward a second side of said ladder.

8. The rotary telescopic boom lift according to claim 3, wherein said locking element comprises a stop member arranged at an end of said ladder.

9. A rotary telescopic boom lift comprising at least one vehicle which can move on the ground and a rotatable assembly comprising at least one telescopic boom adapted to support a work accessory and a cab configured to accommodate an operator;

at least one ladder coupled externally to at least one wall of said vehicle;

at least one handle configured to move between a first configuration for minimum space occupation and a second active configuration, in said first configuration said handle being entirely arranged below a rotation area of said assembly, in said second active configuration at least one portion of said at least one handle protruding upward beyond the upper profile of said vehicle being arranged in the rotation area of said assembly at least proximate to said ladder; at least one sensor adapted to monitor instant by instant the first configuration and second active configuration assumed by said at least one handle, said at least one sensor being associated with a control and management unit, and instructions for the at least temporary inhibition of the rotation of said assembly when said respective handle is arranged in said second configuration.

\* \* \* \* \*